Aug. 4, 1959   G. KLEMT ET AL   2,897,725
OPTICAL SYSTEM WITH LARGE EFFECTIVE IMAGE ANGLE
Filed Feb. 3, 1958
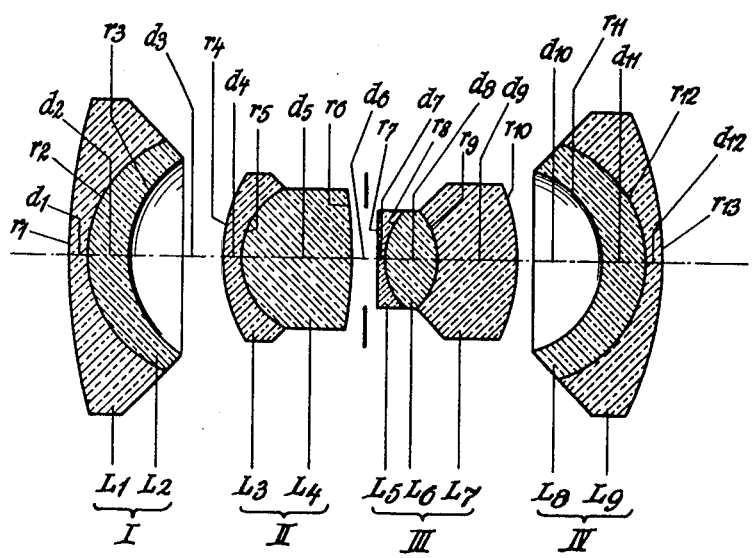
INVENTORS:
Günter KLEMT
Karl Heinz. MACHER
BY
AGENT

United States Patent Office 2,897,725
Patented Aug. 4, 1959

2,897,725
OPTICAL SYSTEM WITH LARGE EFFECTIVE IMAGE ANGLE

Günter Klemt and Karl Heinrich Macher, Kreuznach, Rhineland, Germany, assignors to Jos. Schneider & Co., Kreuznach, Rhineland, Germany, a corporation of Germany Application February 3, 1958, Serial No. 712,916

Claims priority, application Germany February 14, 1957

4 Claims. (Cl. 88—57)

Our present invention relates to an optical objective system designed for high-quality image projection upon a relatively wide area, more particularly to a system of the character described in U.S. Patent No. 2,781,695, issued February 19, 1957, to G. Klemt.

The system disclosed in the aforesaid patent consists of four air-spaced lens members including an inner pair of cemented collective members and an outer pair of dispersive menisci on opposite sides of a diaphragm space, each outer member enclosing with the adjacent inner member an air space in the shape of a positive meniscus. In a preferred embodiment the center or axial thicknesses of the two meniscus-shaped air spaces add up to a distance ranging between 20% and 40% of the overall focal length of the system.

Objectives incorporating the teachings of the prior patent have been constructed with image angles up to approximately 100°, yet the elimination of all the usual distorting factors (e.g. objectionable field curvature in a central zone of projection) has not been feasible for aperture ratios substantially greater than 1:8. The principal reason for this limitation is the excessive curving which the inner, concave surfaces of the outer menisci must undergo when the relative aperture is to be materially increased beyond the value stated.

Our present invention, accordingly, has for its object the provision of an improved optical system of the character referred to wherein a wide angle of projection is coupled with a large relative aperture and which is substantially fully corrected for spherical, chromatic and comatic aberrations as well as for field curvature.

A feature of an optical system according to the present invention resides in the substitution of a compound meniscus member for each of the single lens members of the outer pair, the elements of the compound meniscus member having a common, cemented surface whose concavity faces inwardly, i.e. towards the diaphragm space.

According to another feature of the present invention, the rear lens member of the inner pair (i.e. the one positioned on the image side) is composed no longer of two but of three cemented elements of which the central one is a strongly refractive biconvex lens while the other two are dispersive lenses. The cemented forward surface of the biconvex lens is so curved as to act as a condenser for light rays impinging upon this compound lens member from the object side; thus, the two forward elements of said lens member replace the single positive element of the system of the prior patent. At the same time it has been found desirable to maintain the difference of refractive indices across this cemented surface at less than 0.1.

For the elimination of residual spherical aberration it has further been found advantageous to flatten the external, uncemented faces of the three-element lens member to such an extent that the sum of the reciprocal values of their radii is less than 0.03.

The above and other objects and features of the invention will become apparent from the following description of a specific embodiment, illustrated diagrammatically in the sole figure of the accompanying drawing.

The drawing shows an outer pair of dispersive members I, IV encompassing an inner pair of collective members II, III. Member I comprises a negative meniscus lens $L_1$, having radii of curvature $r_1$, $r_2$ and thickness $d_1$, cemented onto a positive meniscus lens $L_2$ having radii of curvature $r_2$, $r_3$ and thickness $d_2$. Member II, separated from member I by an air space $d_3$, comprises a dispersive element $L_3$, with radii $r_4$, $r_5$ and thickness $d_4$, cemented to a collective element $L_4$, with radii $r_5$, $r_6$ and thickness $d_5$, which turns a nearly flat rear face toward the diaphragm space $d_6$. Beyond this diaphragm space there is positioned a member III with an even flatter forward face, this member having as its cemented elements an almost planoconcave first lens $L_5$ (of radii $r_7$, $r_8$ and thickness $d_7$), a biconvex second lens $L_6$ (of radii $r_8$, $r_9$ and thickness $d_8$) and a negatively refracting third lens $L_7$ (of radii $r_9$, $r_{10}$ and thickness $d_9$). Member IV, separated from member III by an air space $d_{10}$, is approximately symmetrical to member I and comprises a positive meniscus lens $L_8$, of radii $r_{11}$, $r_{12}$ and thickness $d_{11}$, cemented onto a negative meniscus lens $L_9$, of radii $r_{12}$, $r_{13}$ and thickness $d_{12}$.

The parameters $r_1$ to $r_{13}$ and $d_1$ to $d_{12}$, the indices of refraction $n_d$ and the Abbé numbers $\nu$ of lenses $L_1$–$L_9$ may have numerical values as given in the following table, the latter representing an objective system having an aperture ratio of 1:4, an overall focal length of numerical value 100 and an image distance of numerical value 36.8:

| Member | Lens | radius | distance | $n_d$ | $\nu$ |
|---|---|---|---|---|---|
| I | $L_1$ | $r_1 = +222.31$ | $d_1 = 4.47$ | 1.65830 | 57.49 |
|  | $L_2$ | $r_2 = + 48.08$ | $d_2 = 13.91$ | 1.46450 | 65.79 |
|  |  | $r_3 = + 45.07$ | $d_3 = 35.70$ | air space |  |
| II | $L_3$ | $r_4 = + 62.18$ | $d_4 = 6.91$ | 1.58904 | 53.16 |
|  | $L_4$ | $r_5 = + 29.81$ | $d_5 = 39.66$ | 1.60729 | 49.25 |
|  |  | $r_6 = -175.16$ | $d_6 = 7.90$ | air (diaphragm) space |  |
| III | $L_5$ | $r_7 = +550.46$ | $d_7 = 2.57$ | 1.52944 | 51.80 |
|  | $L_6$ | $r_8 = + 27.95$ | $d_8 = 19.98$ | 1.61772 | 49.78 |
|  | $L_7$ | $r_9 = - 27.30$ | $d_9 = 28.55$ | 1.78470 | 26.10 |
|  |  | $r_{10} = - 74.58$ | $d_{10} = 31.23$ | air space |  |
| IV | $L_8$ | $r_{11} = - 36.37$ | $d_{11} = 16.20$ | 1.53375 | 55.37 |
|  | $L_9$ | $r_{12} = - 46.76$ | $d_{12} = 4.97$ | 1.65844 | 50.84 |
|  |  | $r_{13} = -136.37$ | $d_{total} = 212.05$ |  |  |

It will be noted that, in the specific example given hereinabove, the cemented surface $r_8$ of member III is of positively refracting power so that the light rays arriving at the negative rear component $L_7$ of this member, unlike those reaching the corresponding component $L_5$ of the prior patent, have been additionally condensed in spite of the nearly flat shape of the entrance face $r_7$. The refractive indices of lenses $L_5$ and $L_6$, separated by the surface $r_8$, differ by less than 0.1 while the reciprocal values of the outer radii $r_7$ and $r_{10}$ add up to an absolute value less than 0.03.

It will be noted that the large air spaces between members I, II and III, IV, having the shape of positive menisci, have center thicknesses $d_3$ and $d_{10}$ which are between 20% and 40% of the overall focal length of the whole objective, in conformity with the teachings of the prior patent. It may further be mentioned that the center thicknesses $(d_4+d_5)$ and $(d_7+d_8+d_9)$ of the two collective members II and III, when measured against the overall axial physical length $d_{total}$ of the system, are almost as large as in the system of the prior patent while not quite reaching the value of 25% of said overall physical length preferred in the latter system.

The invention is, of course, not limited to the specific example described and illustrated but may be embodied in various modifications thereof without departing from the spirit and scope of the appended claims.

We claim:

1. An optical objective system consisting of four air-spaced members including an inner pair of collective members enclosing a diaphragm space and an outer pair of dispersive members encompassing said inner pair; the forward member of said outer pair consisting of a first element in the shape of a negative meniscus lens and a second element in the shape of a positive meniscus lens cemented onto said first element; the forward member of said inner pair consisting of a negatively refracting third element and a positively refracting fourth element cemented onto said third element; the rear member of said inner pair consisting of a negatively refracting fifth element, a biconvex sixth element cemented onto said fifth element and a negatively refracting seventh element cemented onto said sixth element; the rear member of said outer pair consisting of an eighth element in the shape of a positive meniscus lens and a ninth element in the shape of a negative meniscus lens cemented onto said eighth element; the forward and rear members of said outer pair being separated from the corresponding members of said inner pair by two air spaces in the shape of positive meniscus lenses whose center thicknesses total between 20% and 40% of the overall focal length of the system.

2. An objective system according to claim 1, wherein said fifth and sixth elements have indices of refractivity differing by less than substantially 0.1 and are joined together by a positive-power refracting cemented surface.

3. An objective system according to claim 1, wherein the radii of curvature of the forward face of said fifth element and of the rear face of said seventh element have reciprocal values whose absolute sum is less than substantially 0.03.

4. An objective system according to claim 1, wherein for an overall focal length of numerical value 100 the radii $r_1$–$r_{13}$ of said first through eighth elements $L_1$–$L_8$, the axial thicknesses and spacings $d_1$–$d_{12}$ of said elements, their indices of refraction $n_d$ and their Abbé numbers $\nu$ have numerical values substantially as given in the following table:

| | | | $n_d$ | $\nu$ |
|---|---|---|---|---|
| $L_1$ | $r_1 = +222.31$ | $d_1 = 4.47$ | 1.65830 | 57.49 |
| $L_2$ | $r_2 = +48.08$ | $d_2 = 13.91$ | 1.46450 | 65.79 |
| | $r_3 = +45.07$ | $d_3 = 35.70$ | air space | |
| | $r_4 = +62.18$ | $d_4 = 6.91$ | 1.58904 | 53.16 |
| $L_3$ | $r_5 = +29.81$ | $d_5 = 39.66$ | 1.60729 | 49.25 |
| $L_4$ | $r_6 = -175.16$ | $d_6 = 7.90$ | air (diaphragm) space | |
| | $r_7 = +550.46$ | $d_7 = 2.57$ | 1.52944 | 51.80 |
| $L_5$ | $r_8 = +27.95$ | $d_8 = 19.98$ | 1.61772 | 49.78 |
| $L_6$ | $r_9 = -27.30$ | $d_9 = 28.55$ | 1.78470 | 26.10 |
| $L_7$ | $r_{10} = -74.58$ | $d_{10} = 31.23$ | air space | |
| | $r_{11} = -36.37$ | $d_{11} = 16.20$ | 1.53375 | 55.37 |
| $L_8$ | $r_{12} = -46.76$ | $d_{12} = 4.97$ | 1.65844 | 50.84 |
| $L_9$ | $r_{13} = -136.37$ | | | |

References Cited in the file of this patent

UNITED STATES PATENTS

| | | |
|---|---|---|
| 1,882,530 | Tronnier | Oct. 11, 1932 |
| 2,031,792 | Richter | Feb. 25, 1936 |
| 2,516,724 | Roossinov | July 25, 1950 |
| 2,645,155 | Tronnier | July 14, 1953 |
| 2,721,499 | Bertele | Oct. 25, 1955 |
| 2,730,016 | Bertele | Jan. 10, 1956 |
| 2,734,424 | Bertele | Feb. 14, 1956 |
| 2,781,695 | Klemt | Feb. 19, 1957 |
| 2,789,463 | Kohler et al. | Apr. 23, 1957 |

FOREIGN PATENTS

| | | |
|---|---|---|
| 733,308 | Great Britain | July 6, 1955 |